United States Patent [19]
Kuo et al.

[11] Patent Number: 5,296,643
[45] Date of Patent: Mar. 22, 1994

[54] AUTOMATIC MUSICAL KEY ADJUSTMENT SYSTEM FOR KARAOKE EQUIPMENT

[76] Inventors: Jen-Wei Kuo, 7 Sun Rise La.; Tat N. Ho, 163 Willow Spring Condo, both of New Milford, Conn. 06776

[21] Appl. No.: 949,992

[22] Filed: Sep. 24, 1992

[51] Int. Cl.⁵ .................. G09B 15/04; G10H 1/36
[52] U.S. Cl. .................................. 84/610; 84/634; 84/477 R; 84/DIG. 6
[58] Field of Search ............ 84/601, 602, 609–614, 84/634–638, DIG. 29, 477 R, 478, DIG. 6

[56] References Cited
U.S. PATENT DOCUMENTS 4,546,687 10/1985 Minami .............................. 84/601
5,131,311 7/1992 Murakami et al. ................. 84/609
5,194,682 3/1993 Okamura et al. .................. 84/634

*Primary Examiner*—Stanley J. Witkowski
*Attorney, Agent, or Firm*—Lawrence Hager

[57] ABSTRACT

A system and method for control of so-called KARAOKE equipment whereby the musical key of the pre-recorded accompaniment music may be altered automatically to substantially coincide with the analyzed or given vocal range of the singer, for example, soprano, tenor, mezzo-soprano, baritone, alto or bass, or with the preferred key to be sung entered by the singer, for example, E key, so as to eliminate the trial-and-error manual key adjustments during singing.

18 Claims, 12 Drawing Sheets

TYPE 2 DATA FRAME:

| | |
|---|---|
| CHARACTER 1 | CONTROL FLAGS |
| CHARACTER 2 | CONTROL FLAGS |
| CHARACTER 3 | LOWEST NOTE IN SONG |
| CHARACTER 4 | HIGHEST NOTE IN SONG |
| CHARACTER 5 | KEY AND TEMPO |
| CHARACTER 6 | SONG STYLE INFORMATION |
| CHARACTER 7 | FRAME CHECKSUM |
| CHARACTER 8 | TOTAL NUMBER OF EVENTS |
| CHARACTER 9 | EVENT 1 IN T1 SECONDS |
| CHARACTER 10 | EVENT 2 IN T2 SECONDS |

| | |
|---|---|
| CHARACTER (N+9) | EVENT N IN TN SECONDS |
| CHARACTER (N+10) | FRAME CHECKSUM |

TYPE 1 DATA FRAME:

| | |
|---|---|
| CHARACTER 1 | CONTROL FLAGS |
| CHARACTER 2 | CONTROL FLAGS |
| CHARACTER 3 | LOWEST NOTE IN SONG |
| CHARACTER 4 | HIGHEST NOTE IN SONG |
| CHARACTER 5 | KEY AND TEMPO |
| CHARACTER 6 | SONG STYLE INFORMATION |
| CHARACTER 7 | FRAME CHECKSUM |

FIG. 8

AUTOMATIC MUSICAL KEY ADJUSTMENT SYSTEM FOR KARAOKE EQUIPMENT

FIELD OF THE INVENTION

This invention relates to performance apparatus such as KARAOKE EQUIPMENT and, more particularly, to a system and method for causing one or more parameters of a music recording to be altered to substantially coincide with the system's detected and analyzed vocal abilities of the lead singer.

BACKGROUND OF THE ART FIELD

So-called KARAOKE systems are known, in which one or more singers sing a song while being accompanied by a pre-recorded music composition. Typical KARAOKE equipment contains a plurality of manual switches to enable the operator to set the echo/reverberation, key shifter, tone, and volume adjustments prior to or during playing the music composition. The operator or moderator, sometimes called a disc-jockey (D.J.), asks the singer what key he/she sings in and then activates the key switch believed to be the singer's vocal key range. The prior art KARAOKE equipment enables manual adjustment of the key (shifter).

Not infrequently, however, the amateur singer does not know his/her singing key or provides the operator with a wrong key. In addition, the key in which the pre-recorded musical piece was performed/recorded is typically unknown to the KARAOKE singer and the operator. Accordingly, the KARAOKE experience of such singers singing off-key with the music can be embarrassing and may result in diminished participation by other would-be KARAOKE singers.

Further, a singer's voice may not exactly coincide with one of the six conventional keys. The prior art KARAOKE equipment is limited to manual key adjustment by trial-and-error technique as the KARAOKE music is being played. Typically, a KARAOKE singer is subjected to several trial runs, which may be embarrassing, in an attempt to select the best suited key shift adjustment of the KARAOKE singer's voice. Such embarrassing trial runs may be avoided by use of the present invention.

DISCLOSURE OF SOME PRIOR ART REFERENCES

A number of KARAOKE systems have been proposed such as described in U.S. Pat. No. 4,995,026 issued Feb. 19, 1991, to Dai Makbe Shinjuku and Yuji Kumai Shinagawa, which discloses a method for automatically controlling the lighting equipment associated with the KARAOKE equipment.

Other prior art references of interest include U.S. Pat. Nos.: 5,085,116 issued Feb. 4, 1992 to Takuya Nakata et al; 5,062,097 issued Oct. 29, 1991 to Michiaki Kumaoka, Hamamatsu; 4,939,974 issued Jul. 10, 1990 to Takaski Ishida and Yasunao Abe; 4,546,687 issued Oct. 15, 1985 to Eiji Minami et al.

In all these prior art systems, however, manual switch(es) adjustment is required to select the key of the pre-recorded music composition to the key which the KARAOKE singer thinks his voice ability is, or, not infrequently, simply playing the music composition in its natural recorded key. Both the aforementioned techniques may result in a mismatch of the key of the music and the KARAOKE singer.

In contrast with the prior art, the present invention provides a KARAOKE system which analyzes the voice ability of the KARAOKE participant, for example, his/her key range, compares the participant's voice ability with the recorded characteristic(s) of the music composition, and adjusts the characteristic(s), e.g., key signature, of the pre-recorded music composition to substantially correspond and/or compliment and/or coincide with the detected characteristic(s) of the KARAOKE participant. In addition, the present invention, in contrast to the prior art, can provide a KARAOKE system for: pre-recording the song/music profile (key, style, tempo, highest and lowest notes, etc.) on the KARAOKE song/music media, e.g., audio tape or compact disc etc.; three modes of automatic adaptive key adjustment capability; encoding the song profile in real and/or non-real time data storage on the KARAOKE song/music media; and for displaying the vocal range on a display means.

SUMMARY OF THE INVENTION

Essentially, and in accordance with the invention, the new KARAOKE system provides for encoding the song/music profile on the recording media, system determination of the vocal ability of the volunteer participant singer, decoding the song/music profile, and adjusting the song/music characteristics such as key signature to provide an improved performing environment, and/or harmony with the singer's voice abilities, etc.

SOME OF THE OBJECTS OF THE INVENTION

It is an object of the present invention to provide an accompaniment system capable of automatically adjusting the key of a pre-recorded music composition to the key range of a singer.

It is a further object of the present invention to provide an accompaniment system for determining one or more voice characteristics of the user of the system.

It is a further object of the present invention to provide an accompaniment system for comparing the music characteristics of a recorded music composition with the vocal characteristics of a live performer-singer.

It is a further object of the present invention to provide a song's profile data representative of the key range, key signature, tempo, style, etc. of a recorded music composition for use with musical accompaniment equipment.

It is a further object of the present invention to provide a music and/or a song recording containing encoded data representative of one or more characteristics of the music/song such as style, key, tempo, highest and lowest notes.

It is a further object of the present invention to provide a new and improved accompaniment system such as used in so-called KARAOKE for providing an improved singing environment.

It is a further object of the present invention to provide a new and improved KARAOKE type accompaniment system which automatically adjusts the key component of a music recording being played to substantially coincide with the singing ability of a singer.

It is a further object of the present invention to provide a new and improved KARAOKE type accompaniment system which utilizes vertical blanking interval encoding of song profile data, e.g., style, key, tempo and volume.

It is a further object of the present invention to provide a new and improved KARAOKE type accompaniment system which utilizes so-called KARAOKE software having data encoded thereon synchronized with the vertical blanking interval(s) set forth on a Laser Disc or "VHS" tape.

It is a further object of the present invention to provide a new and improved KARAOKE type accompaniment system having real time control of stage-effect apparatus such as lighting and other special effects equipment by encoding such data commands at appropriate instances in time during the course of the song.

It is another object of this invention to provide a new and improved method of matching the KARAOKE music with the vocal abilities of the singer.

It is a still further object of the present invention to provide a new method and means for determining one or more selective characteristics of a person's voice such as musical vocal range (i.e. tenor or alto, etc.), and to enable automatic or manual adjustment of a new type KARAOKE equipment/system to adjust the pre-recorded music accompaniment to accommodate/compliment the determined voice characteristic(s) during a KARAOKE performance.

Further advantages and objectives of the present invention will be apparent from the following detailed description of the preferred embodiment of the invention. Like numerals refer to like devices/functions throughout.

BRIEF DESCRIPTION OF THE DRAWINGS

FIG. 8 is a diagrammatic chart illustrating two types of asynchronous data characters of music/song profile information in accordance with the present invention;

DETAILED DESCRIPTION OF THE INVENTION

The following is a detailed description of the best presently contemplated modes of carrying out the invention. This description is not to be taken in a limiting sense but is made merely for the purpose of illustrating the general principles of the invention since the scope of the invention is best defined by the appended claims.

Figure 1:
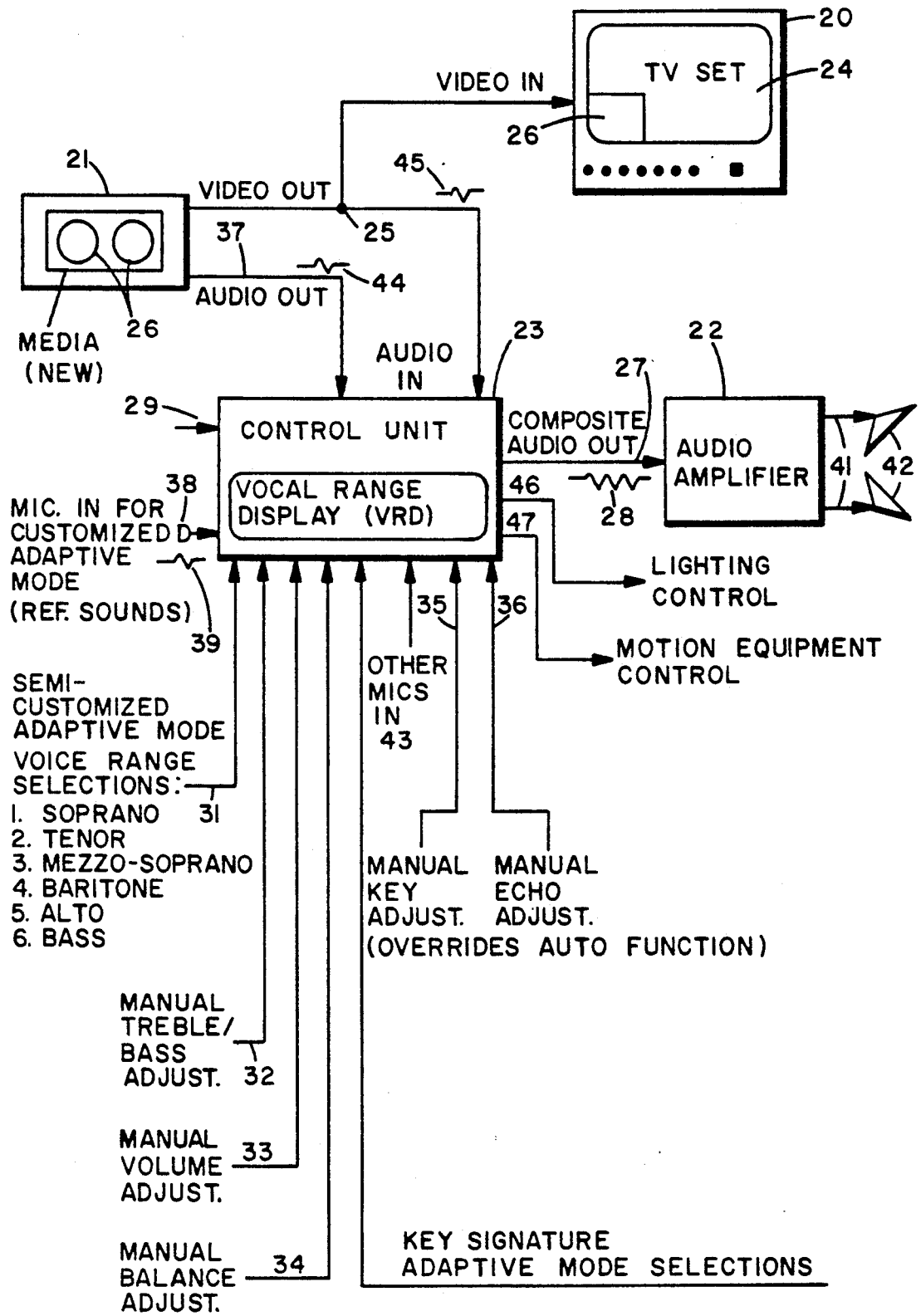
FIG. 1 is a block diagram of a KARAOKE presentation system in accordance with the present invention.

Referring now to FIG. 1, a block diagram of the KARAOKE presentation system comprises a television set 20, an audio/video playback apparatus 21, audio amplifier 22 and a control unit 23.

The television set 20 may be a standard commercially available television having an input jack (not shown). Typically, the words to the song are displayed on the screen 24 of the television to aid the singer. A highlighter or pointer (not shown) may also be displayed to indicate each word or phrase which should be vocalized to be in tempo or synchronism with the music.

Television set 20 is operatively coupled to the audio/video playback apparatus 21, via connector 25 for receiving the pre-recorded video information, such as the lyric composition to be sung with the music being played. Other information, in accordance with the invention, may also be displayed on the screen 24, such as, for example, staging directions to the performer to facilitate physical as well as the vocal presentation-performance of the (KARAOKE) singer-performer. In this manner, an amateur (KARAOKE) performer may be aided to not only sing in a rhythmic pattern, e.g., accent, meter and tempo, but also to follow visually display directions or animation like illustrations of suggested physical performances which compliment the music and lyric being performed. For example, hand or arm or so-called body language that coincides with and dramatically enhances the presentation. The visually displayed directions may be simultaneously presented on screen 24 in a split screen or dual screen format display 26. Since television sets capable of such presentation are generally available, a detailed technical discussion thereof will not be presented to avoid prolixity.

The audio/video playback equipment 21 may comprise an audio tape recorder or video record/playback system such as analog or digital audio tape recorder, compact disc player (CD), laser disc player or so called VCR/VHS video recorders, etc. Such equipment 21 are readily available and, therefore, a detailed discussion thereof is unwarranted herein.

Audio/video playback equipment 21 is operatively coupled to the control unit 23, and, if a video system is used, to the television set 20, via lead 25.

Audio/video playback equipment 21 is utilized to play the pre-recorded audio and/or audio/video media such as an audio/video tape 26.

Figure 10:
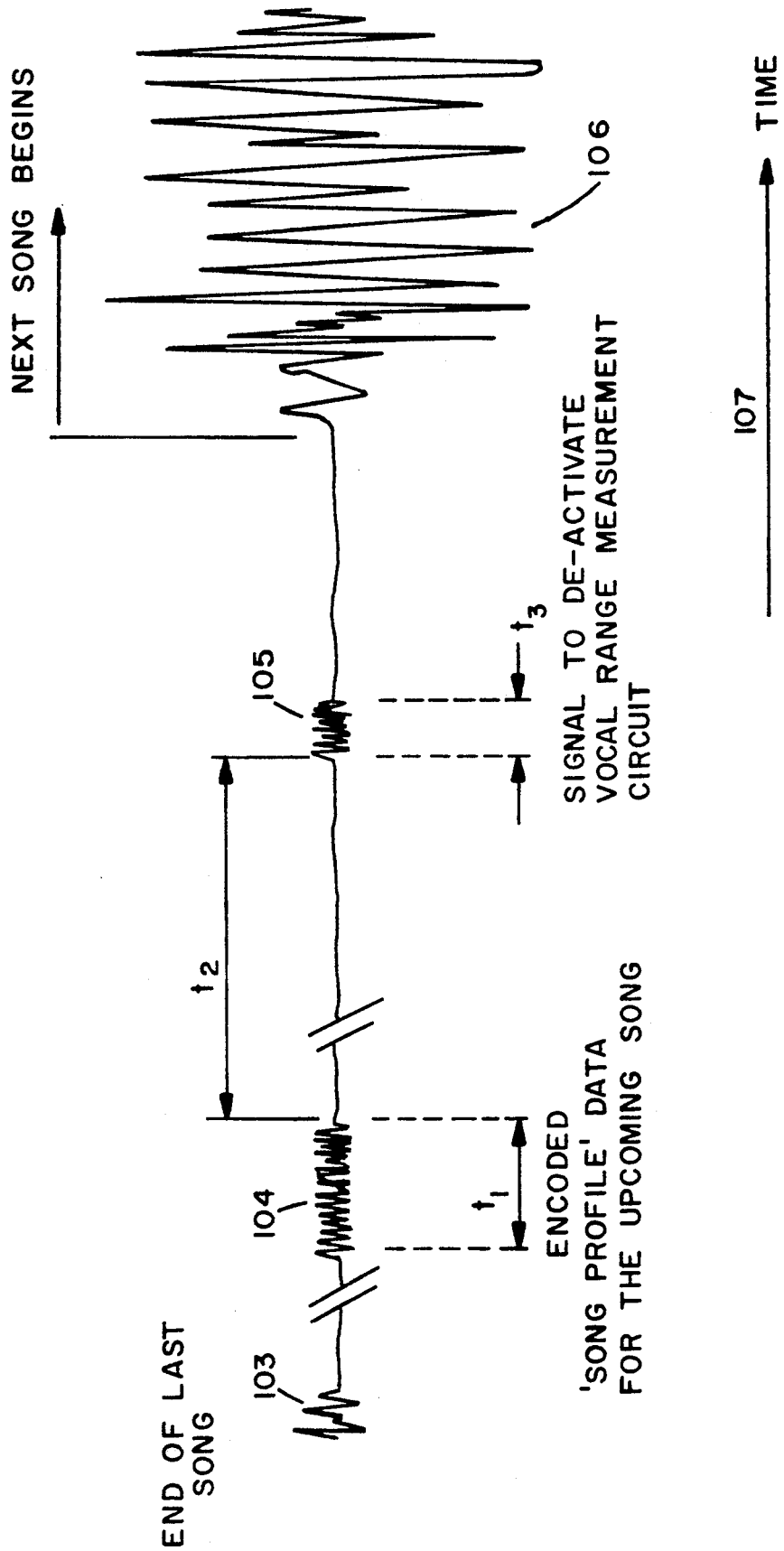
FIG. 10 is a waveform diagram illustrating encoded music/song profile data between two music/song recordings in a non real-time format in accordance with the present invention.
Figure 11:
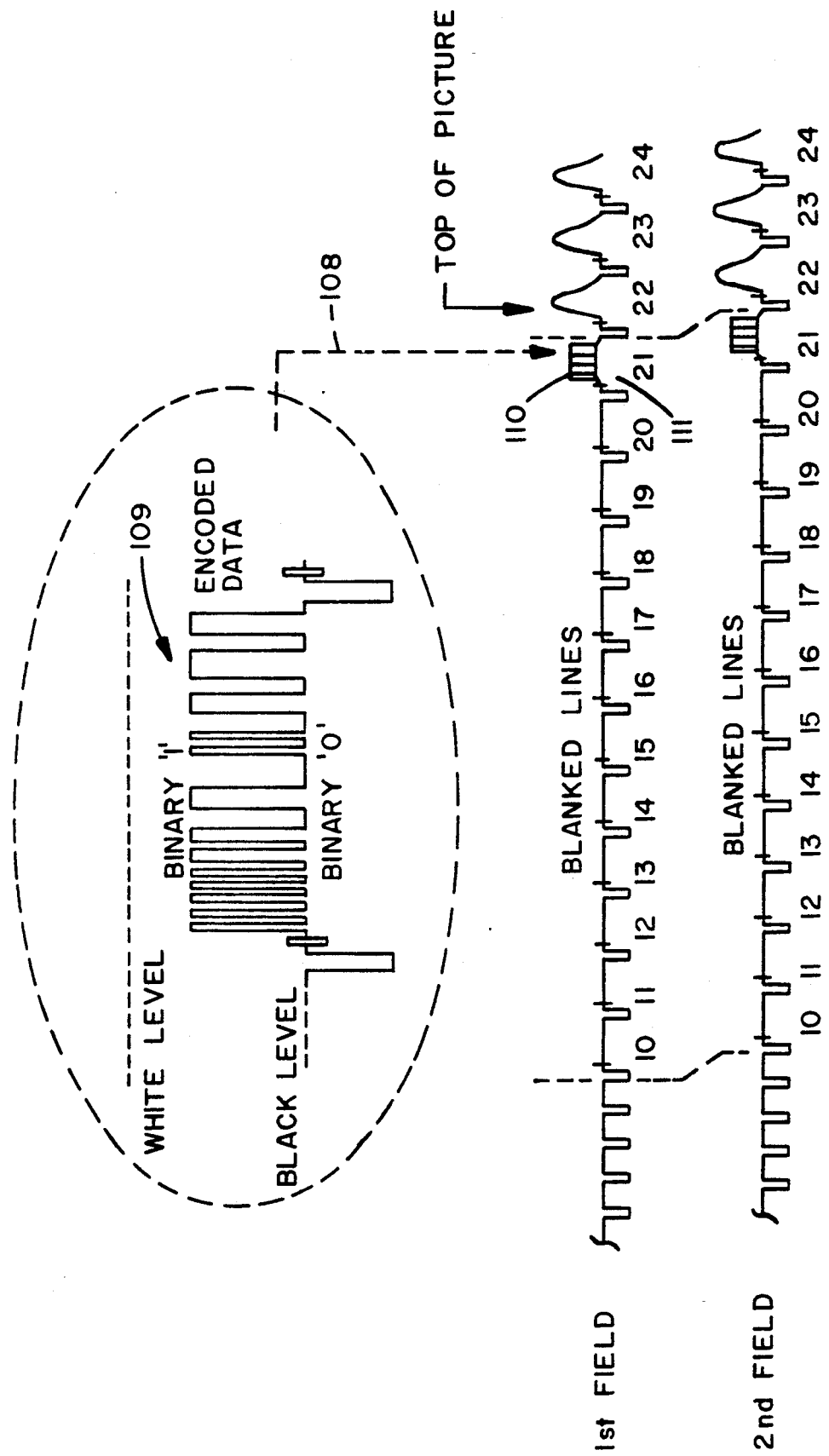
FIG. 11 is a waveform diagram illustrating encoded music/song profile data on a video media format, i.e., during the vertical blanking interval periods, the real-time encoding format in accordance with the present invention.

Audio/video playback equipment 21 converts the media 26 recorded data (music and the music/song profile information) into an electrical signal (as shown in FIGS. 10 and 11) and transmits same, via lead 25, to the system control unit 23 and television set 20. It should be recognized, however, that the present system concept may be utilized without a television set 20. The data media, hereinafter described in great detail, and more particularly the data provided thereon is an important feature of the present invention. Audio/video playback equipment or component may comprise a stand alone unit or may be integrated into the control unit 23.

The audio amplifier 22 is of conventional design and is commercially available. The audio amplifier 22 is operatively coupled, via lead 27, to control unit 23. Control unit 23 provides a composite audio signal 28, via lead 27, to audio amplifier 22. As will be more fully understood hereinafter, the composite audio signal 28 includes the music composition having its key or frequency range modified to coincide with the key range of the KARAOKE singer.

The control unit 23 functions in three automatic modes, and a manual mode. The three automatic modes are: (1) fully customized adaptive, (2) semi-customized adaptive, and (3) key signature adaptive. A vocal range display panel 30 is provided on the front of the control unit 23 to enable activation of the automatic modes or manual mode. Control unit 23 also includes a plurality of manually activated switches of conventional design. Said manual switches are functionally depicted by arrow-headed inputs including: a customized automatic mode select switch 29, a semi-customized automatic mode select switch 31, a key signature automatic mode select switch 113, a treble/bass switch 32, a volume adjustment switch 33, a balance switch 34, a manual key select switch 35 and and echo adjustment switch 36.

Customized automatic mode select switch 29 may be manually activated to energize control unit 23 to perform the customized adaptive automatic key adjustment functions. As will be discussed in more detail hereinafter, the music/song profile information is coupled, via lead 37 and/or lead 25, to control unit 23. The singer (not shown) is then requested to vocalize several phrases or words in a high and low key into the reference microphone 38. Control unit 23 processors analyze the high and low frequency voice ability of the singer and condition its control circuitry for altering the incoming electrical signal representations of the pre-recorded music/song, provided by playback equipment 21, and media 26, via lead 37 or 25, to substantially coincide with the frequency singing range or its harmonics and subharmonics of the singer. As the singer sings into microphone 38 while the music/song information is being processed, the key adjusted pre-recorded music/song and singer's voice are mixed within control unit 23. At this time the combined/mixed music and singer's voice signal may be further altered for echo and/or volume and/or balance effects. This composite audio signal 28 is then coupled, via lead 27, to the audio amplifier 22. In this manner, the singer's voice abilities/limitations are complemented in order to produce an improved and enhanced audio output. As will be more fully appreciated with referenced to FIG. 6, when operated in the fully customized adaptive automatic key control mode of control unit 23, the music/vocal range of the pre-recorded music composition, i.e., from media 26, is key shifted to substantially match or correspond with the singer's vocal range whether or not his/her vocal range coincides with the six standard or recognized key ranges, 81 thru 86. Thus, in this operating mode the key shifted signal frequency range 79 may abridge two or more such standard key range 85,86 categories or comprise a narrow portion of a standard key 87.

Figure 7:
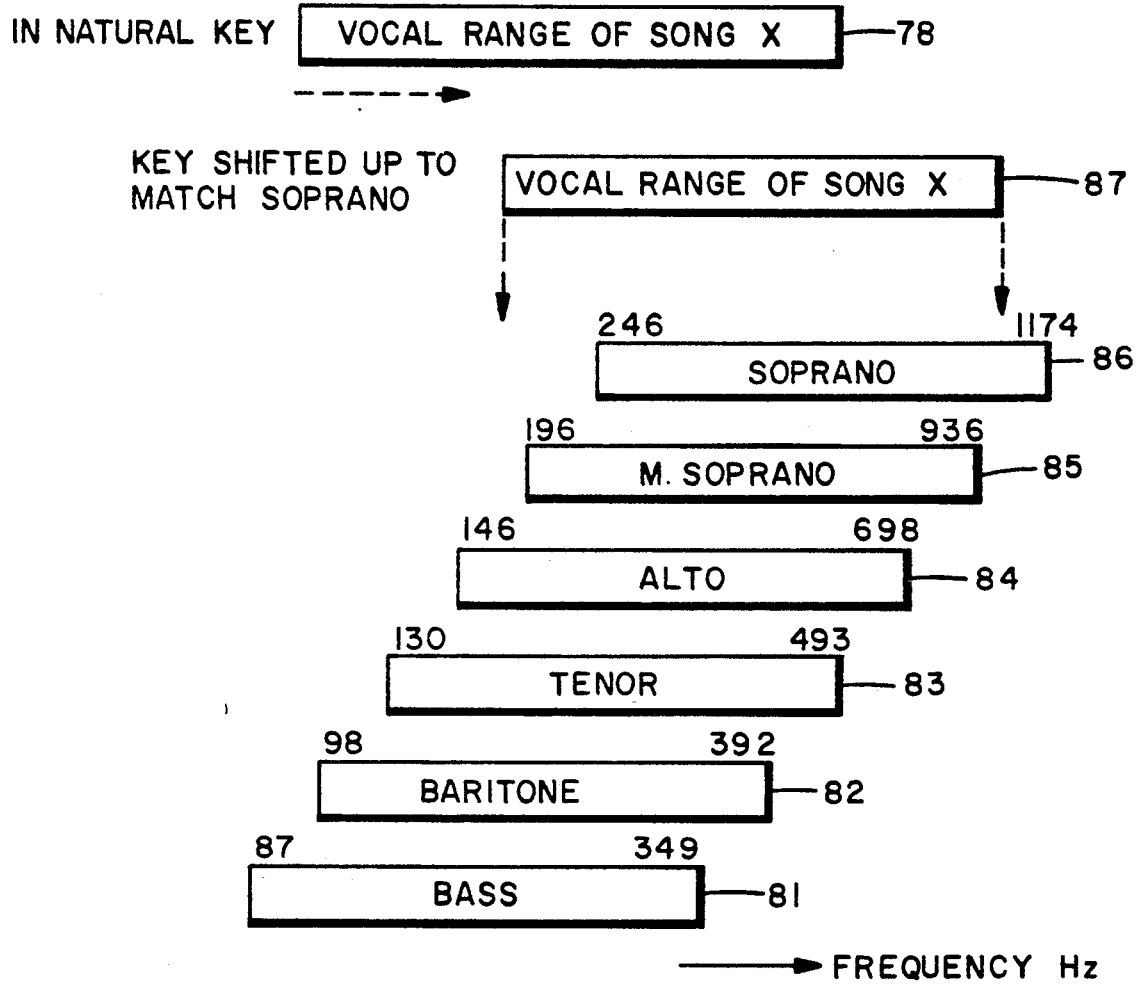
FIG. 7 is a diagrammatic view illustrating the semi-customized automatic key adjustment of the pre-recorded music to correspond with the system measured key range of a singer in accordance with the present invention.

Semi-customized adaptive automatic mode select switch 31 may be manually activated to energize control unit 23 to perform the semi-customized adaptive automatic key adjustment functions which are illustrated in FIG. 7. In contrast to the fully customized adaptive mode described above, this mode does not utilize/require the voice analyzing circuitry. Basically speaking, the singer (not shown) is asked which of the six standard vocal categories is most similar to his/her singing voice. Next, the semi customized adaptive mode select switch 31 is toggled until the desired vocal category is selected as indicated by L.E.D. indicators 49. With control unit 23 now activated for semi-customized adaptive automatic key (frequency) adjustment, audio/video playback equipment 21 is activated to begin sending its encoded audio and/or audio-video signal(s) 44, 45, to control unit 23 and television set 24. Control unit 23 decodes the encoded audio and/or audio-video signal(s) 44, 45 and in response to the decoded music/song profile data, conditions its circuitry for adjusting the audio signal component of the audio and/or audio-video signal(s) 44, 45, to the key range selected by the equipment operator (not shown) as indicated on the vocal range display panel 30 by an energized (illuminated) respective LED 49. As noted above, the KARAOKE singer's voice, via microphone 38, is converted to an electrical signal 39 and mixed with the key adjusted audio signal component of the audio and/or audio-video signal(s) 44, 45. This composite audio signal 28, for example, adjusted for key frequency range and/or echo and/or volume and/or balance and/or treble/bass, is coupled via lead 27 to the audio amplifier 22 and thence, via lead(s) 41, to one or more speakers 42 of conventional design.

Figure 3A:
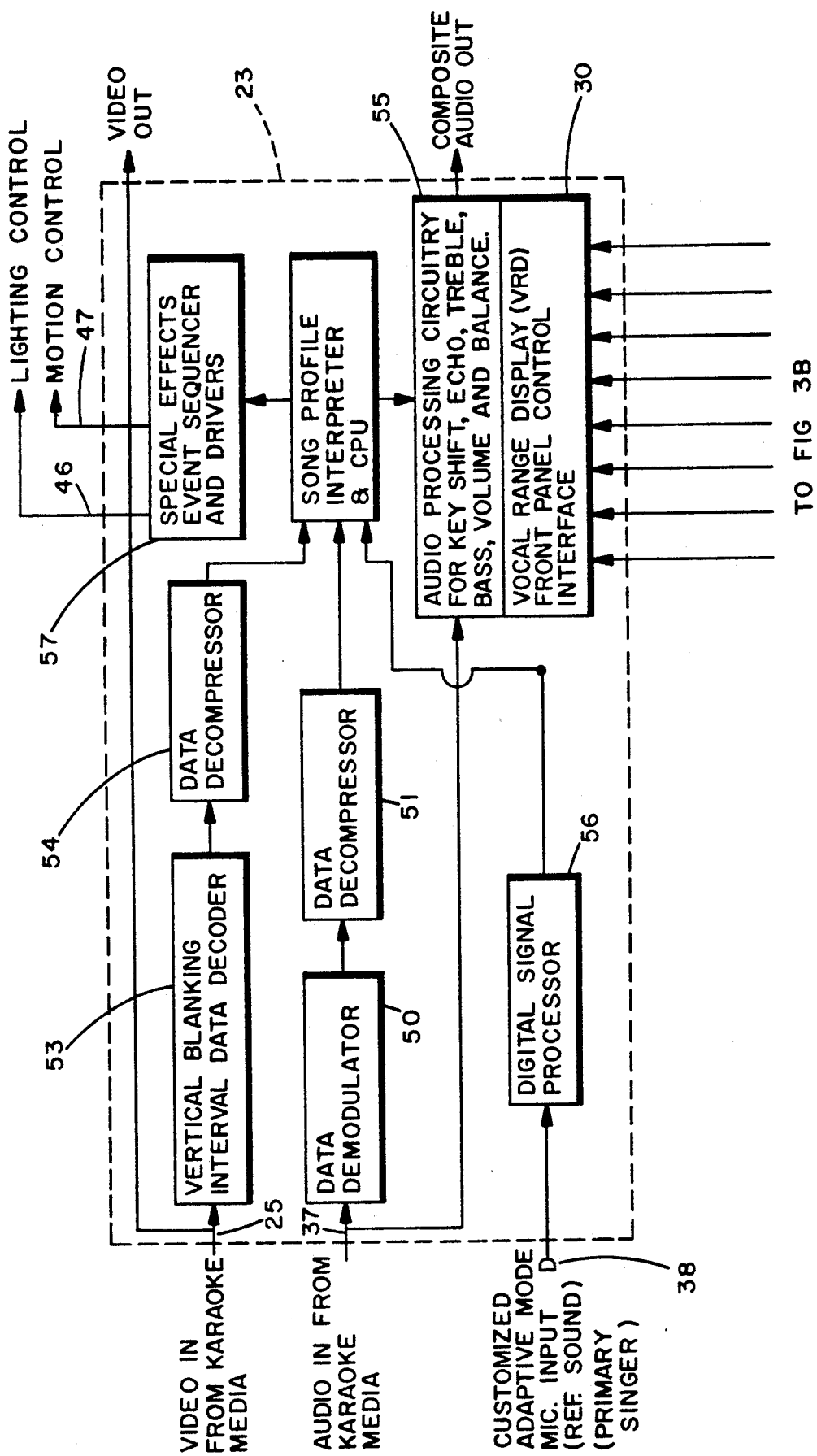
FIGS. 3A and 3B is a block diagram of the system controller shown in FIG. 1.
Figure 3B:
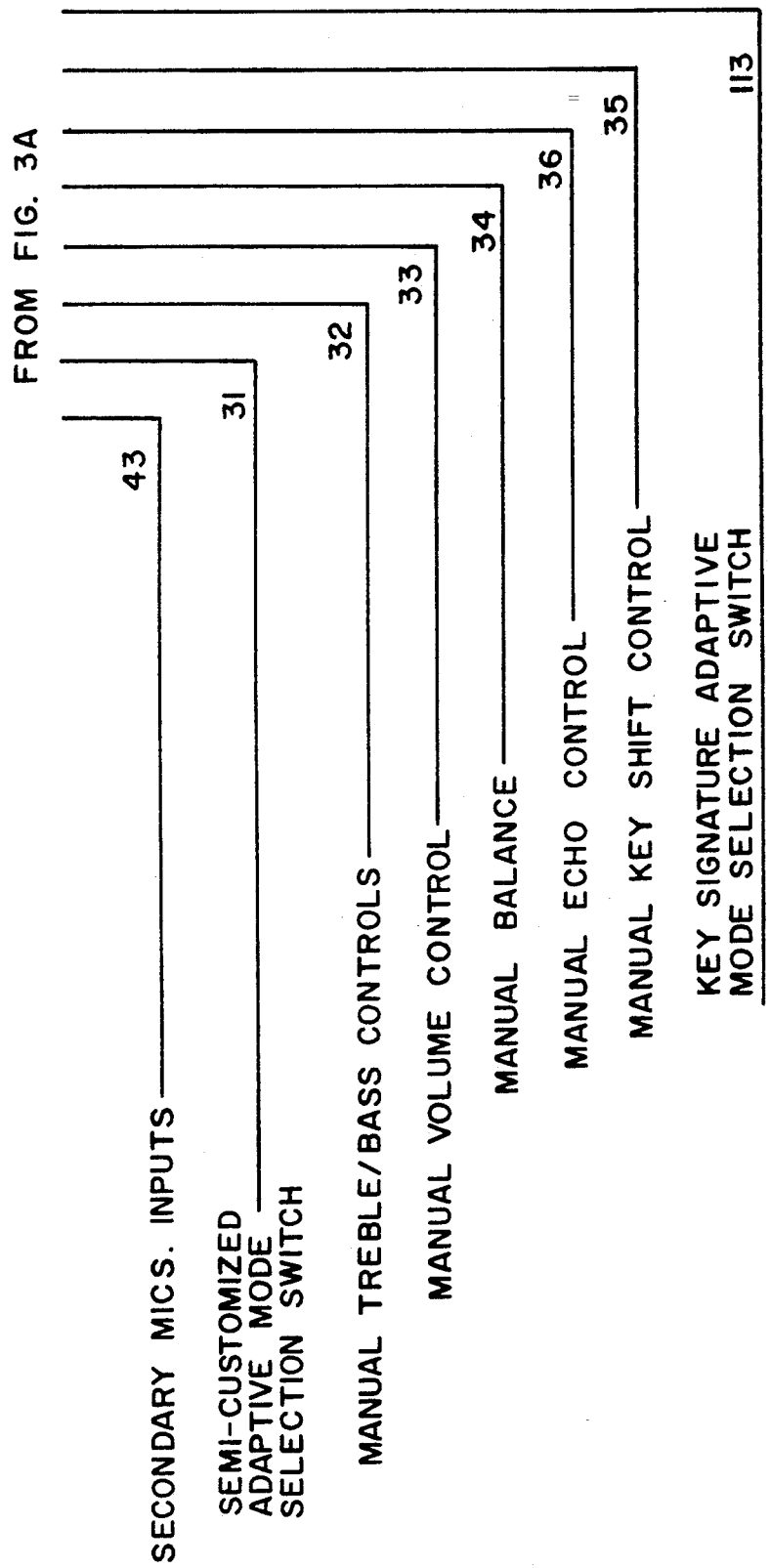
Figure 4A:
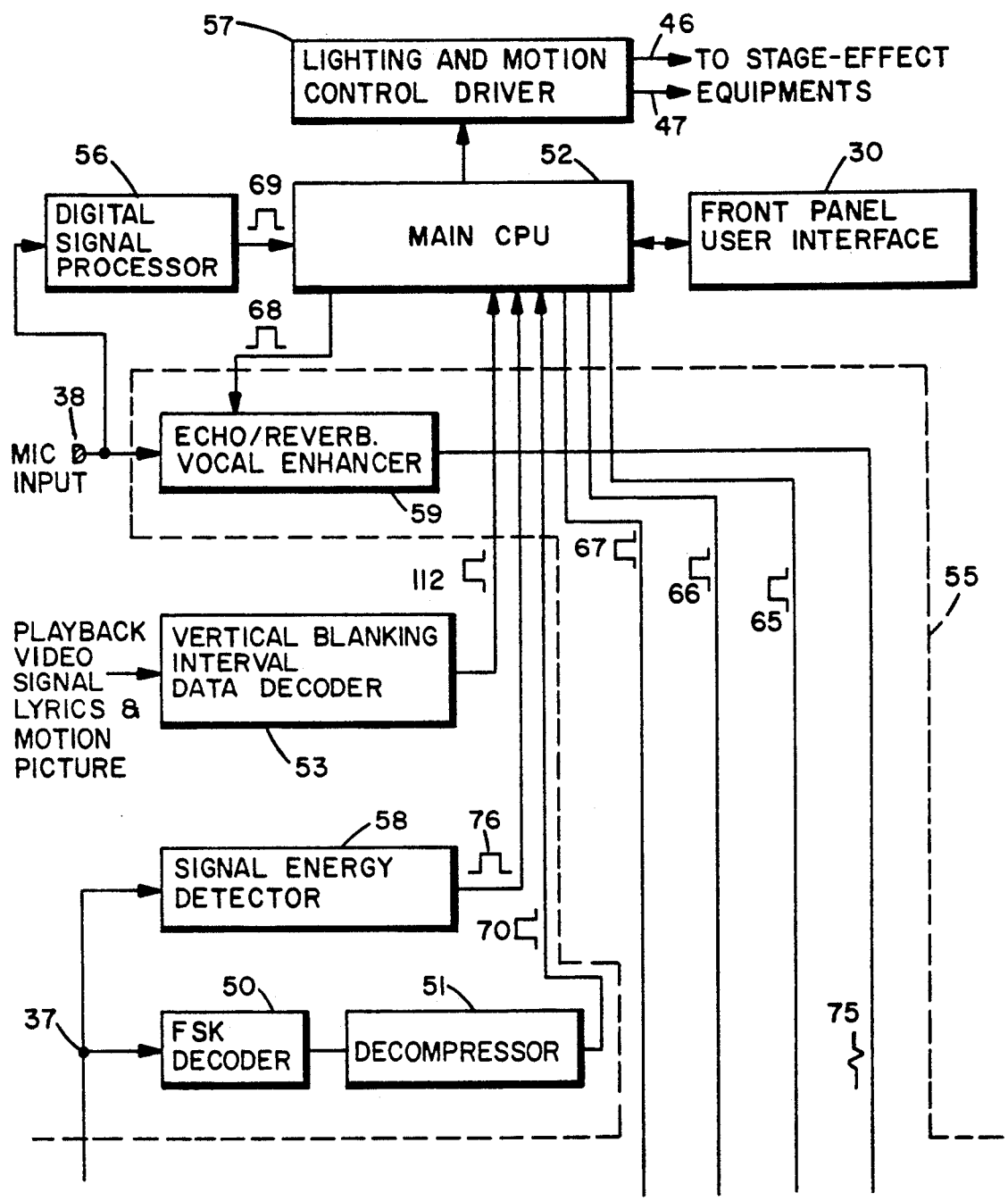
FIGS. 4A and 4B is a more detailed block diagram of the system controller circuit shown in FIGS. 3A and 3B.
Figure 4B:
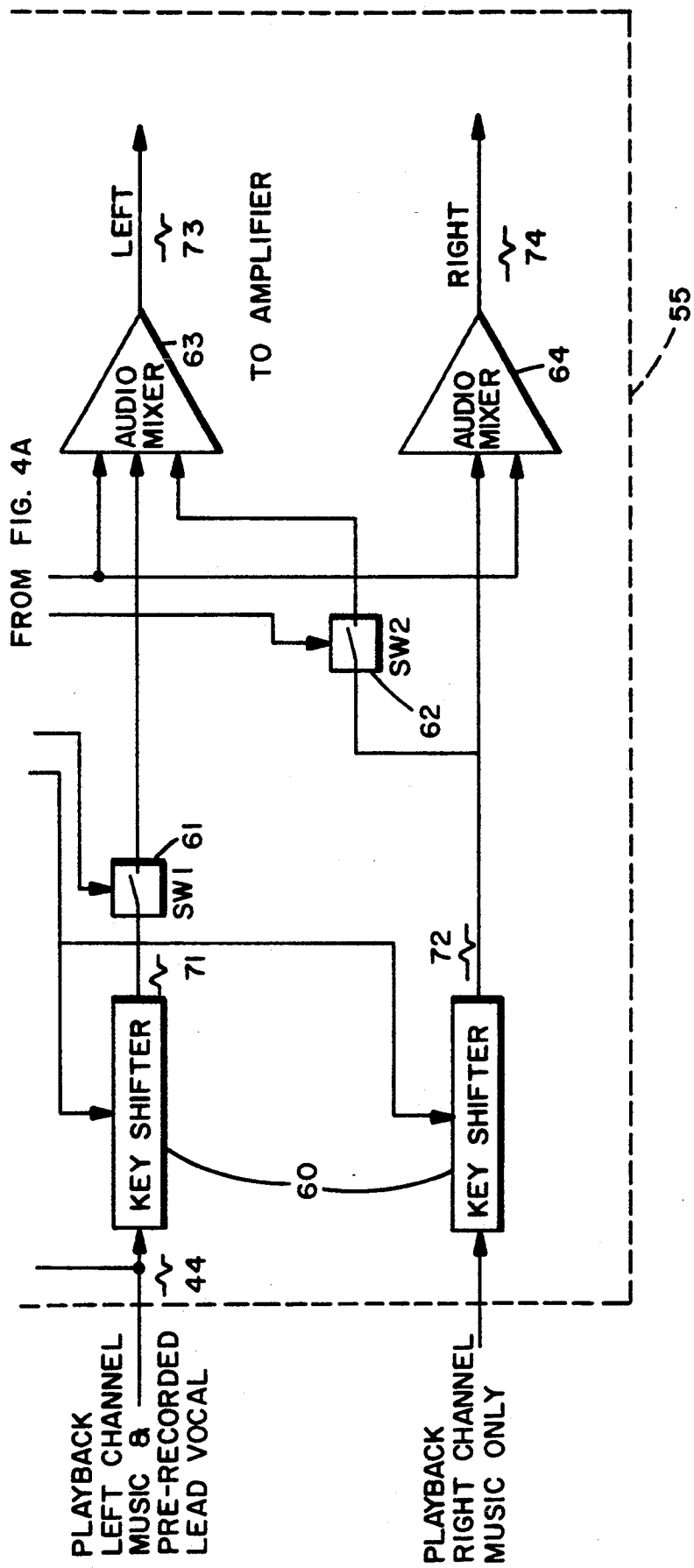

Key signature adaptive automatic mode select switch 113 may be manually activated to energize control unit 23 to perform the key signature adaptive automatic key adjustment functions. Basically speaking, the singer selects his/her favorite or most comfortable key signature by toggling switch 113 until the desired key signature is selected as indicated by the L.E.D. indicators 114 (FIGS. 3A and 3B). With control unit 23 now activated for key signature adaptive automatic key adjustments, audio/video playback equipment 21 is activated to begin sending its encoded audio and/or video signals 44, 45 to control unit 23. Control unit 23 decodes the encoded signals 44, 45 and in response to the decoded music/song profile data, conditions its circuitry to key shift/transpose the audio music signal 44 by the required amount such that the key shifted song/music is played in the selected key signature.

In addition to the three automatic functions, control unit 23 also includes manual adjustments, one or more other microphones 43 for back-up singers (not shown), a lighting control output 46, and motion equipment control output 47.

Figure 2:
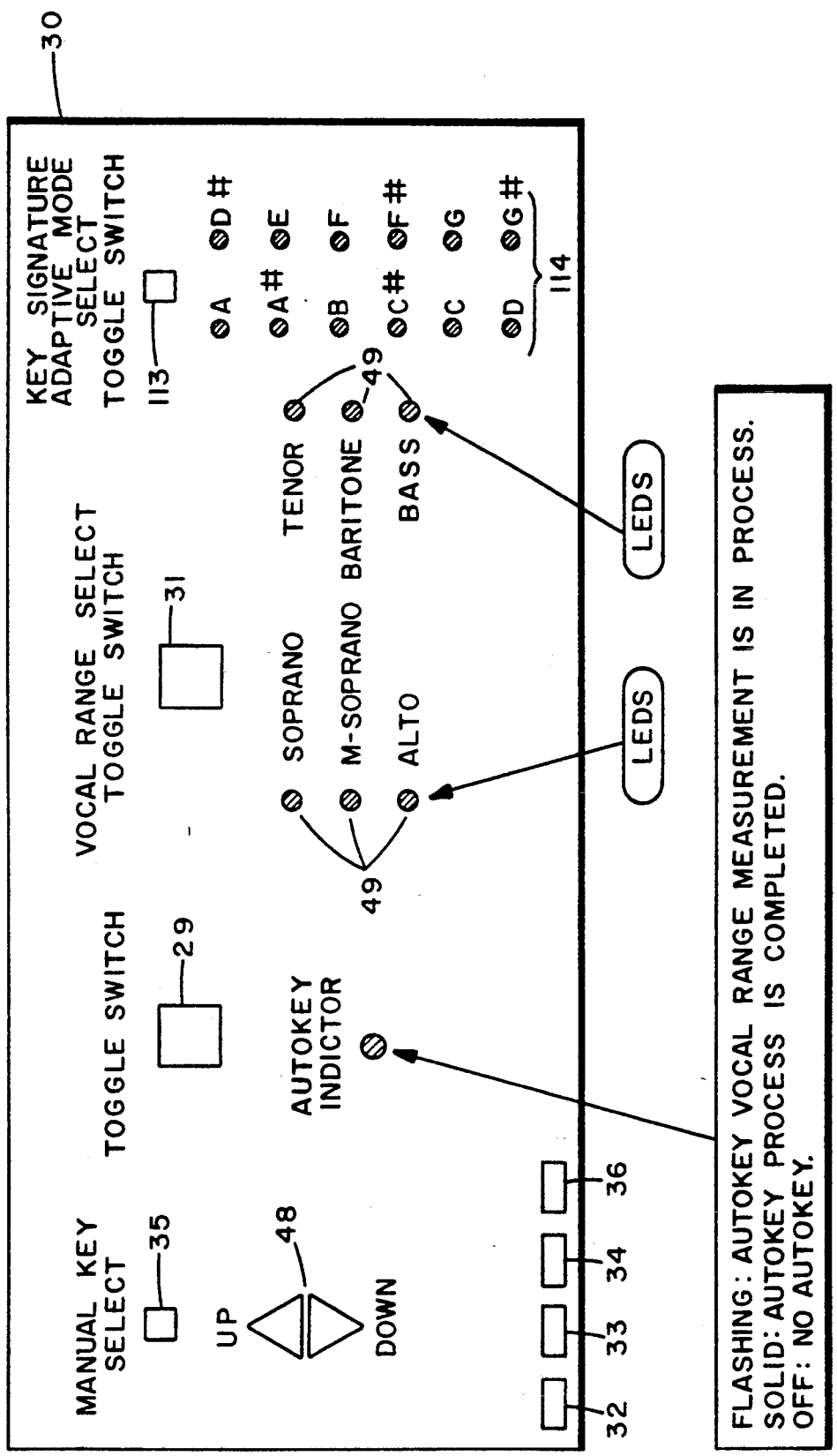
FIG. 2 is a plan view of the vocal range display control panel in accordance with the preferred embodiment of the invention.

A manual on/off select switch 35 of conventional design, for example, a toggle switch, is provided (see FIG. 2). With switch 35 in the off position, the operator may select to activate the automatic functions of the system. With switch 35 in the ON position, the manual override functions of switches 32 through 36 are enabled. Switches 32 through 36 may be of conventional design to enable the operator to selectively adjust the respective functions. Switches 32 through 36 may be so-called thumb-wheel type switches or slide switches or any other suitable variable type switch. Manual switch 32 is provided to enable the operator to adjust the treble and base characteristics of composite signal 28 and, therefore, the treble base sound output of speakers 42. Switch 33 is provided to enable manual adjustment of the volume of the sound output of speakers 42.

Switch 34 is provided to enable manual adjustment of desired balance/imbalance of the sound output of a plurality of speakers 42. Switch 48, with on/off switch 35 in the on position, enables manual incremental/decremental adjustment of the key (frequency range), in steps of one-half note of the pre-recorded music/song, generated via recording media 26 and audio/video equipment 21, to substantially compliment or coincide with the vocal (key) abilities of the singer. Switch 36, with on/off switch 35 in the ON position, enables manual adjustment of the so-called echo effect or component of the composite signal 28, and, therefore, of the sound output of speakers 42.

In addition to the principal microphone 38, one or more back up singer microphones 43 may be accommodated by control unit 23. Such back up singer microphones 43 may be utilized to enable several persons to sing as back up to the primary KARAOKE singer, i.e., voice input from microphone 38. It should be understood, that control unit 23 contains input jacks (not shown) of conventional design for receiving the (electrical input signal) jack of the respective microphones.

The present system also includes a light control signal output 46 and a motion equipment control signal output 47. In order to enhance the KARAOKE experience, the stage effects such as lighting changes and/or movement of selected stage scenery may be desired. One of the features and advantages of the present invention is the provision of so called real time control signals for controlling, for example, stage/audience lighting and/or scenery changes/motion effects. Such effects are accomplished in a manner different from and substantially superior to that of the above noted prior art references. For example, in contrast to the prior art, the present system contemplates and can accommodate the use of analog video media such as live broadcast, Betamax, V.H.S., etc. The term—real time control—is used to describe an aspect of the present invention in which such control data is encoded on the audio and/or video media 26 to provide controlled stage effect changes during the KARAOKE performance.

Referring now to FIGS. 3A thru 4B, block diagrams illustrating the processing functions of the control unit 23 (shown in phantom outline) comprises a vertical blanking interval data decoder 53, a data decompressor 54, a song profile interpreter 52, a digital signal processor 56, processing circuitry 55, vocal range display panel 30, and a special effects event sequencer and drivers 57.

The composite video signal 45 is coupled from the video output of audio/video device 21 to the vertical blanking interval data decoder 53 and to the video input of television set 20, via lead 25.

Vertical blanking interval data decoder 53 functions to decode the encoded data 109 (FIG. 11) generated during the vertical fly-back interval of the video signal. The composite video signal 45, which includes the encoded song profile and/or stage effect data is operatively coupled from the audio/video playback device 21 to the input of the vertical blanking interval data decoder 53. The song profile and stage effect data 58 is operatively coupled to data decompressor 54. Data decompressor 54 decompresses the stage effect data and converts it into usable form, which is then coupled to the song profile interpreter 52.

It should be understood that the present invention is functional/supports an audio-only processing mode where the composite audio signal 44 is simultaneously coupled from the output of audio/video device 21 to data demodulator 50 and the audio processing circuitry 55, via lead 37. Data demodulator 50 demodulates or extracts the song profile data, e.g., key, tempo and style, etc., from composite audio signal 44 and couples the demodulated data to the data decompressor 51. Data decompressor 51 decompresses the song profile data and converts it into usable form, which is then coupled to the song profile interpreter 52.

Song profile interpreter 52 in response to the stage effect data provides control signals to the special effects event sequencer 57 and to the audio processing circuitry 55. Song profile interpreter comprises conventional circuitry which includes, for example, a central processing unit (CPU) or microprocessor(s) 52, a decoder 50 and a signal energy detector 58. Generally speaking, the song profile interpreter/CPU 52 in response to an analysis of the vocal ability of the KARAOKE singer and comparison with the profile data of the pre-recorded music/song composition, provides control signals 65–68 to the audio processing circuitry 55. These control signals effect, if necessary, adjustment of key shifter circuits 60 to adjust the pre-recorded music/song key or frequency range to correspond with that of the KARAOKE singer, and control signals to effect echo/reverberation enhancement to the KARAOKE singer's voice. IN addition, the song profile interpreter/CPU 52, in response to decoded stage effect signals, provides light and/or motion control signals, via driver circuits 57 to control the lighting and scenery effects during the KARAOKE singer's performance. Decoder 50 is a data demodulator of conventional design, which converts the audio analog signals into digital data form. Data decompressor 51 comprises conventional circuits, for decompressing the digital data derived from data demodulator/decoder 51 and converts it into readable form 70 which is coupled to CPU 52. The signal energy detector 58, also of conventional design, basically detects, measures and converts into digital signal 76 form the signal energy/volume levels of the audio input signal 44. Digital signal 76 is coupled to CPU 52, which partially based on digital signal 76 data and data 69 obtained from digital signal processor 56 provides control data signals 68 to vocal enhancer unit 59.

As will be more fully described hereinafter, digital signal processor 56 measures and converts to digital signal 69 form selected vocal characteristics of the singer's voice input audio signal (via microphone 38) such as, for example, the singer's key and/or high-low note frequency etc.

CPU 52 in response to data signals (69, 70, 76 and 112) provides control signals 65 through 68 to right channel switch 62, left channel switch 61, key shifter units 60, and to vocal enhancer unit 59, respectively.

Vocal enhancer 59 in response to the audio input, via microphone 38, and control signal 68 from CPU 52, generates a composite or enhances audio signal 75 which is coupled to the left and right audio mixers 63, 64. Audio signal 75 and the key shifted pre-recorded music/back up singer composition signals 71, 72 are mixed or joined into left and right audio signal outputs 73, 74 by the audio mixers 63, 64. The left and right audio signals 73, 74 are coupled to speakers (not shown).

It should be noted at this time that the circuit details and components of the audio processing circuitry 55 may be of conventional design as presently being utilized in typical KARAOKE systems and therefore, a detailed description will not be provided.

Figure 5:
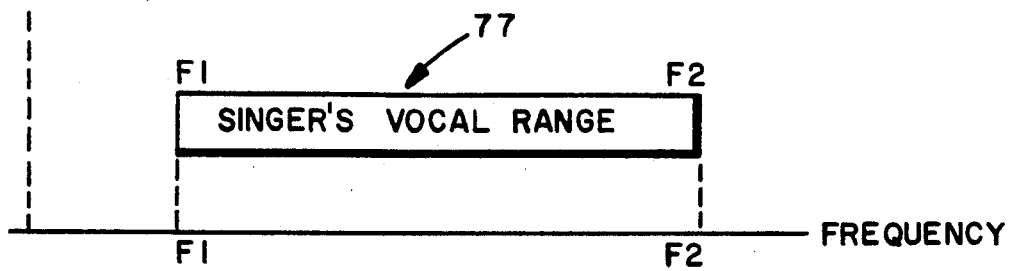
FIG. 5 is a diagrammatic view illustrating the vocal range of an individual.

Referring now to FIG. 5, a diagrammatic view illustrating one of the novel features of the present invention will now be highlighted. Basically speaking, the vocal ability/characteristics of the KARAOKE singer are determined by the new KARAOKE system in accordance with the present invention. This method is in contrast with the prior art KARAOKE methods/equipment whereby the singer/operator must know his/her vocal characteristic as well as the key range and key signature of the pre-recorded music in order to properly set up the prior key shifter. In the prior art, if the singer does not know his/her key range, typically the pre-recorded music is played in its natural key, whether or not that music key coincides with the singer. As will become more clear hereinafter, the present invention enables automatic matching of the singer's vocal range to the selected piece of pre-recorded background music that is encoded with the song profile information.

In accordance with the present invention, when in the customized adaptive automatic mode, the KARAOKE singer (not shown) is requested to speak/sing one or more key phrases or notes into microphone 38 generally prior to the playing of the pre-recorded music/composition selected to be performed. The singer's voice is analyzed by control unit 23 to determine the signer's audio frequency range between 80 to 3000 hertz.

For example, the singer's low frequency F1 and high frequency F2 vocal units are determined. Based on these calculations/determinations, the frequency band or key range 77 is ascertained. The singer's vocal range 77 may or may not correspond with the six standard key ranges 81-86 (see FIG. 6). This informational data is coupled to CPU 52 for processing. It is noted that the human voice may contain may harmonics and subharmonics of one or more fundamental frequencies. Accordingly, control unit 23, e.g., digital signal processor 56 and CPU 52, may be programmed by software/firmware algorithms etc. to facilitate such determinations. Alternatively, conventional circuits which include audio signal frequency and energy discriminator filters etc. may be utilized. Since conventional and commercially available equipment are known for determining the vocal frequency range and/or frequency spectrum of a person further discussion thereof is omitted to avoid prolixity.

Figure 6:
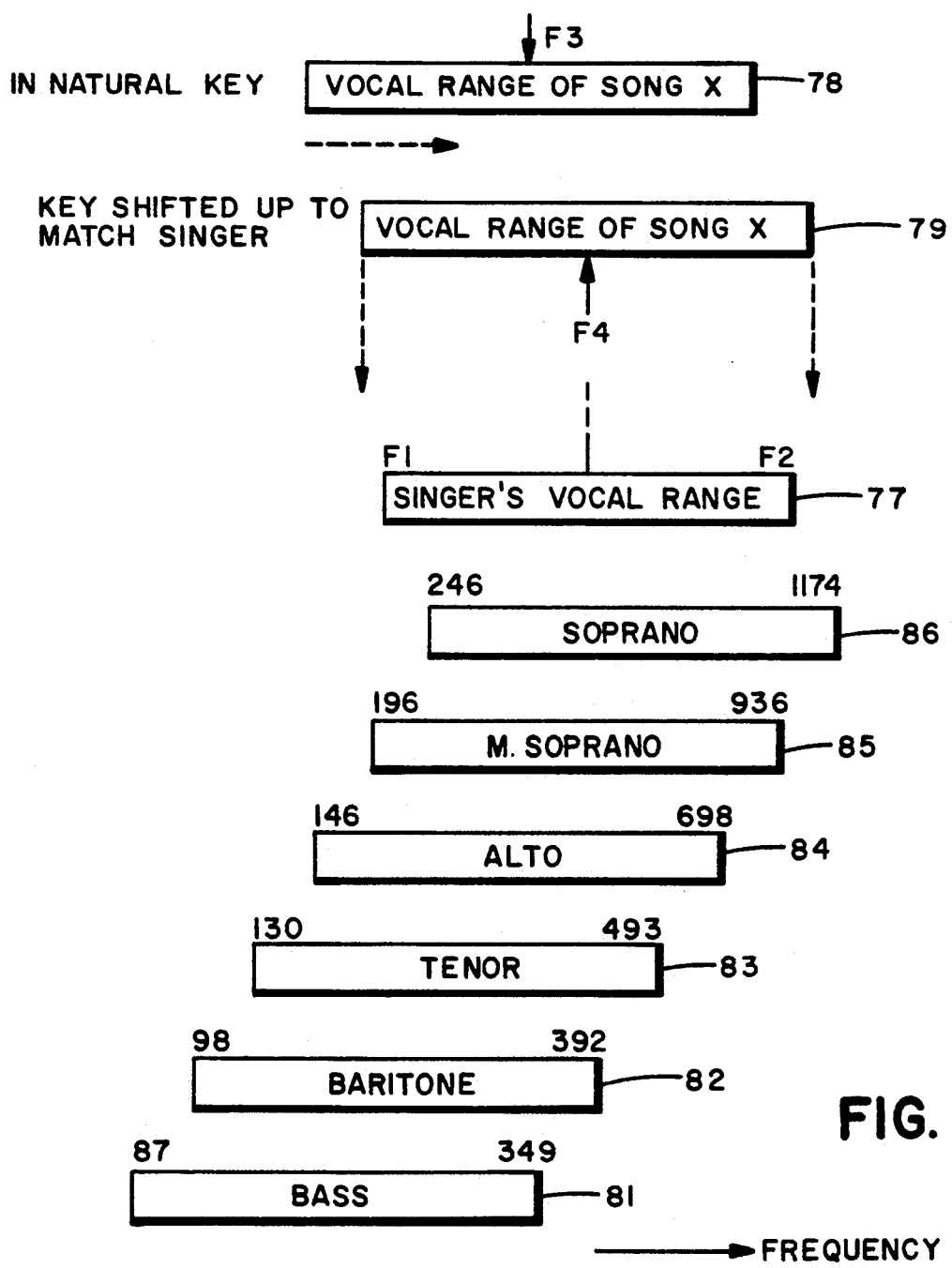
FIG. 6 is a diagrammatic view illustrating the fully customized adaptive automatic key adjustment of the pre-recorded music to correspond with the system measured key range of a singer in accordance with the present invention.

With particular reference now to FIG. 6, the so-called customized adaptive automatic key control process features, and advantages of the present KARAOKE system will now be described. It will be assumed that a pre-recorded KARAOKE media 26 has been placed in the audio/video playback equipment 21. The KARAOKE media 26 being provided with encoded song profile data in accordance with the present invention, which will be described hereinafter in detail with reference to FIGS. 8 through 11. The encoded song profile data 109 includes the key frequency range and natural key signature in which the selected song X 78 was recorded. This key data is provided to control unit 23 prior to providing the pre-recorded music/song signal 44 to control unit 23. With the automatic mode switch 29 in the ON position, the KARAOKE performer's vocal ability relating to his/her vocal frequency range 77 is determined as described above with reference to FIG. 5, prior to the music/song signal generation by playback equipment 21. Central processing unit 23 compares the natural or recorded key range of song X 78 with the KARAOKE performer's vocal range 77. Following this data comparison, control unit 23 provides control signals 65-68 described in detail with reference to FIG. 4, to effect alteration of the pre-recorded music/song frequency range, for example, 98-392 hertz (when received from playback equipment 21) to substantially coincide with and/or overlay the KARAOKE performer's vocal range or its harmonics and subharmonics, for example, F1-F2. For purposes of understanding, it may be envisaged that song X (natural key) and the performer's vocal range each comprises a group of signals depicted within a rectangular package or frequency band 78 and 77, respectively. The center (frequency) F3 of music/song X package 78 is key shifted up to form an adjusted music/song X package 79 having an adjusted center frequency F4 corresponding with the center frequency F4 of the performer's vocal range package 77. It being understood that each of the signal frequencies comprising or included within the natural vocal range of song X package 78 is adjusted upwardly by the same frequency range factor.

It is noted that an advantage of the present invention lies (1) in the ability to first determine the performer's vocal range 77 and (2) to substantially coincide or overlay the pre-recorded music/song key range with that of the performer, whether or not such signal bands, e.g., 79 and 77, conform to traditional key ranges 81-86, and whether or not he/she is familiar with the pre-recorded musical piece or its key range. In this manner a substantially improved or better match of the frequency range of the performer and the pre-recorded music/song may be effected without the heretofore trial-and-error inefficiencies of the prior art KARAOKE systems.

With particular reference now to FIG. 7, the so-called semi-customized adaptive automatic control process of the present invention will now be described in detail. As above, it will again be assumed that a pre-recorded KARAOKE media 26 encoded with profile data in accordance with the invention has been inserted into audio/video playback equipment 21. For illustration purposes, the vocal range is divided into six standard categories generally referred to as bass, baritone, tenor, alto, mezzo soprano and soprano with characteristics/frequencies as shown in FIG. 7. The KARAOKE performer is asked which one of the six vocal categories 81-86 he/she is to assimilate. The operator (not shown) then activates vocal range select switch 31 on VRD 30 (see FIG. 2) and toggles it until the requested vocal category is selected/activated as indicated by indicator 49. For example, if the soprano category is requested, switch 31 is repeatedly pushed until the indicator light associated with soprano is illuminated. Next, the operator activates audio/video equipment 21 to begin providing the encoded song profile data to control unit 23. Control unit 23 compares the natural or recorded key range of song X with the key category selected by the performer. Following this data comparison, control unit 23 provides control signals 65-68 to effect any adjustment, if required, to the key shifter circuits 60 to adjust the key range 78 of song X to match the selected category. Also, control unit 23 in response to the song profile data provides control signals 68 to effect the echo-reverberation enhancement, etc. As illustrated in FIG. 7, if the soprano category 86 was activated on VRD 30, the package of vocal range frequency signals represented by block 78 when received at key shifter units 60 is shifted up 87 to lie within the soprano category 86.

The key signature adaptive automatic control process will now be described. The singer selects his/her favorite or comfortable key signature using front control panel mode select switch 113. Next, the audio/video playback equipment 21 is activated to begin providing the encoded song profile data to control unit 23. In particular, the natural key signature of the pre-recorded song is extracted/decoded and compared to the selected key signature. Following this data comparison, control unit 23 provides control signals 65-68 to key shifter 60 to effect any adjustments, if needed. The key shifted song 71, 72 is now played in the selected key signature. Further, control unit 23 in response to the song profile data provides control signals 68 to effect echo-reverberation enhancement, etc.

With reference to FIG. 2, the manual mode of the system will now be described. As noted above, the front control panel or vocal range display panel 30 is operatively coupled to CPU 52 via conventional connectors. The operator places manual mode switch 35 in the On position. Next, the operator adjusts the key shifter 60 with use of push buttons 48 and adjusts echo switch 36, volume switch 33, treble/base switch 32 and balance switch 34. Basically speaking, in the manual mode, the present KARAOKE system is functional with conventional prior art media and with the new media 26 which contains encoded song profile data.

With reference now to FIG. 8, two types of data frames recorded on media 26 are illustrated. The song profile information consists of a sequence of asynchronous characters. The character format is 10 bit per character; 8 data bits, no parity, one start bit and one stop bit. The leas significant bit (LSB) bit-0 of each character is transmitted first. Shown in FIG. 8, are two types of data frames, i.e., Type 1 or short frame and Type 2 or long frame, in accordance with the present invention.

Characters 1 and 2 of each data frame are control flags which provide the required control information/data to control unit 23.

Characters 3 and 4 of Type 1 and Type 2 frames contain the encoded data representative of the lowest and highest notes, respectively, of the natural key of the pre-recorded KARAOKE song X selected by the performer. In response to this data, control unit 23 is capable of analytically treating or key shifting the vocal (block) range of song X frequencies as described with reference to FIGS. 6 and 7.

Character 5 contains the encoded data indicative of the key and tempo and character 6 the style information of pre-recorded song X.

Character 7 contains the frame checksum data to enable control unit 23 to verify the integrating of the received data.

As illustrated by the Type 1 data frame, the basic information or data representative of the song profile in accordance with the present invention is provided in a seven character frame format.

The Type 2 data frame contains the same first 7 characters as noted above with reference to the Type 1 data frame, plus additional characters assigned to event sequence data. For example, character 8 contains data indicating the total number of events being transmitted. Characters 9 through N+9 contains the associated events 1 through N+9 data in T1 through TN seconds, respectively. In other words, the desired stage effect control data such as light and motion commands are provided in an enlarged Type 2 data frame.

Figure 9:
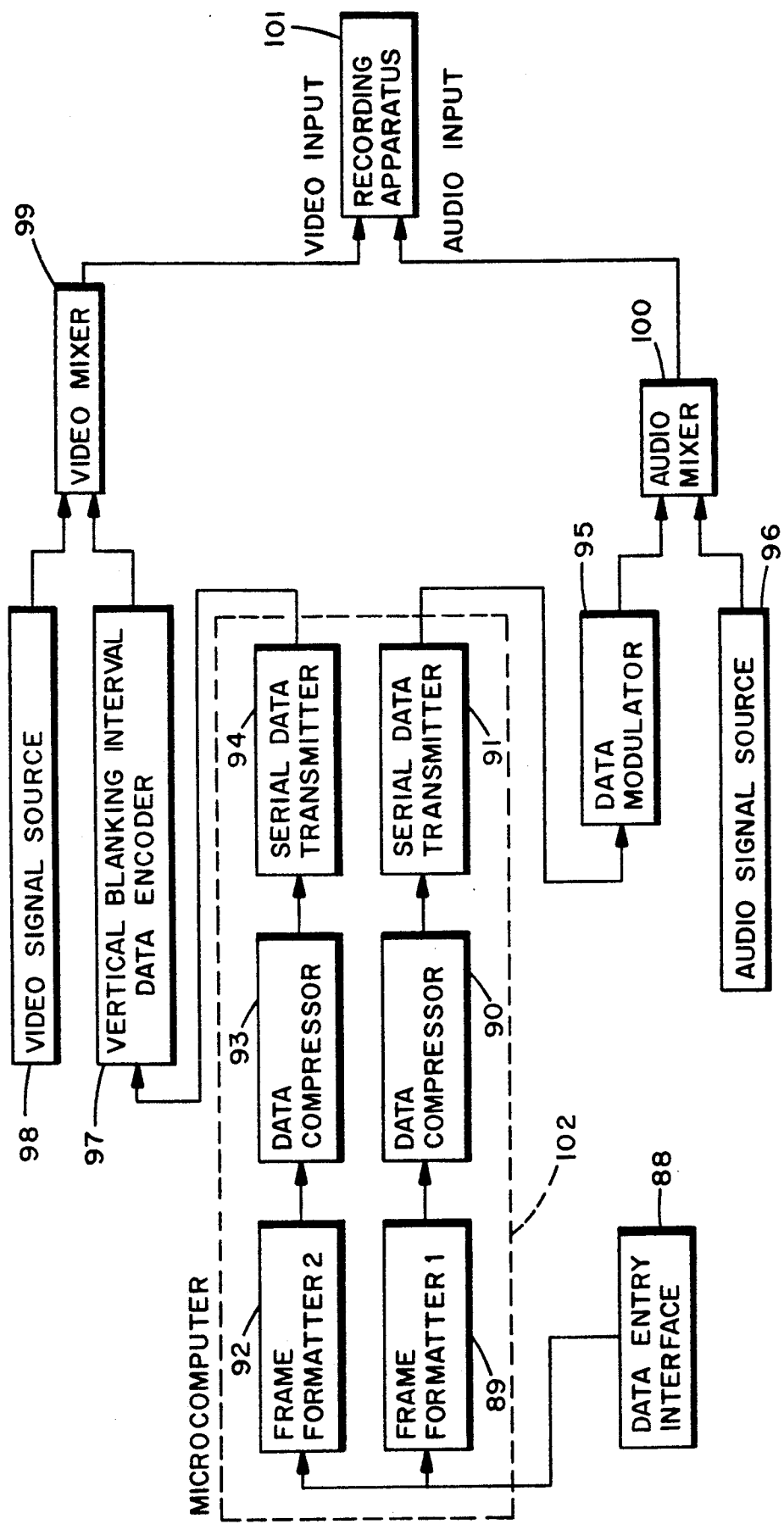
FIG. 9 is a block diagram of a system for generating and recording of music/song profile data onto a KARAOKE media in accordance with the present invention.

With reference now to FIG. 9, the system/apparatus for generating and recording the song profile data onto the KARAOKE media 26, in accordance with the invention, will be described.

The data entry interface unit 88 generally comprises a standard keyboard and display monitor (not shown), to enable a programmer to enter the song profile data and stage effect data. Data entry interface unit 88 is operatively coupled to the audio and video frame formatter units 89 and 92 of microcomputer 102. Frame formatter 89 provides editing function to the song profile data into standard non real-time frame format. The term non real-time frame format is used to define the imprinting/modulating of the song profile data onto the media 26 during periods not utilized for song X recording. Generally, the non real-time song 35 profile data is recorded so that said data is transmitted to control unit 23 prior to the transmission of song X to control unit 23. Frame formatter 89 is operatively coupled to data compressor 90. Data compressor 90 functions to compress the profile data and stage effect data in order to save transmission time. Data compressor 90 is operatively coupled to serial data transmitter 91. Serial data transmitter 91 functions as a parallel-to-serial character formatter. The serial formatted data is coupled to data modulator 95, which converts the serial digital data output of serial data transmitter into analog form. This analog data is coupled to audio mixer 100, which mixes/modulates the analog song profile data with the audio signal output of audio signal source 96 as illustrated in FIG. 10.

The composite signal output of audio mixer 100 is coupled to the recording apparatus 101 for being recorded onto a selected media 26 such as, for example, an audio tape or video tape or compact disc, laser disc or other suitable media. In this manner, the song profile and stage effect data are encoded onto the recording medium 26 as, for example, an audio frequency/phrase/amplitude modulated signal and placed in the rest period preceding song X or between two songs. In systems where there are two separate audio tracks (e.g., left and right), either one or both of the tracks may be used for data encoding.

For real-time encoding of song profile and/or stage effect data, i.e., where the information is continuously or repeatedly transmitted to the recording apparatus prior to and/or while the song is being played, the song profile and stage effect data is processed along the real-time encoding path 92-94 of microcomputer 102 similarly to the non real-time encoding path 89-91. The serial data output of serial data transmitter 94 is coupled to the input of the vertical blanking interval data encoder 97. Vertical blanking interval data encoder 97, in response to the serial data output of transmitter 94, generates a signal representative thereof but which is suitable for mixing into a video waveform. The signal output of data encoder 97 is coupled to video mixer 99, which in response thereto and the output signal from video signal source 98, generates a composite video and song profile/stage effect signal (FIG. 11). This composite video and song profile/stage effect signal is coupled to recording apparatus 101 for recording onto the selected video medium 26.

Since the circuit details of the constituent components 88-102 are conventional, a detail description thereof is omitted to avoid prolixity.

With reference now to FIG. 10, an audio track containing encoded song profile data 104 is illustrated in accordance with the present invention. Typically, KARAOKE song tracks 103, 106 are recorded onto, for example, an audio tape or compact disc with unused or dead time between the sequential song tracks. In accordance with the present invention, song profile and/or stage effect data 104 are provided shortly following the end of one song 103, for example, during t1 period and prior to the start of the next song 106 or song X. The encoded song profile data/stage effect data 104 relating to song 106 is transmitted to control unit 23 prior to song 106, i.e., during t1 period. This may be understood by visualizing the audio track(s) depicted in FIG. 10 moving from right-to-left, which is represented by playback time (arrow) 107 moving from left-to-right. As noted above, the song profile data/stage effect data 104 are encoded onto the recording medium 26 as frequency or phrase or amplitude modulated signals during the rest period between two songs 103, 106. Use of this rest period is herein referred to as non real-time control signal transmission since it does not occur contemporaneously with transmission of song X.

Following transmission of song profile data/stage effect data 104, a pause period t2 is provided in order to permit reaction time for the operator to consider whether or not to perform a vocal range measurement of the performer. During this pause period t2, the operator may stop playback apparatus 26 and, thereby, increase or elongate the pause period t2 for whatever length of time required to perform the vocal range measurement procedure previously described.

With the reactivation of playback apparatus 26 by the operator, i.e., his conclusion of the physical measurement procedures, a recorded signal 105 is transmitted to control unit 23 during period t3 to deactivate the vocal range measurement circuit/functions and activate the key shifter 60 and vocal enhancer 59 circuits, in accordance with the control functions of the system.

In this manner, the system is made user friendly for assimilating song X (106) with the performer's voice and complementing/enhancing stage effects.

With particular reference now to FIG. 11, the vertical blanking interval encoding method will be described in detail. For ease of understanding, the entire composite television signal which may contain equalizing pulses, vertical sync pulses, horizontal sync pulses will not be discussed. In accordance with the present invention, the song profile data/stage effect data 104 are recorded onto the video signal on one or more lines during the vertical blanking intervals in much the same way as that used for closed caption Television broadcast, where lines 21 in both fields are used for carrying data as shown in FIG. 11. The basic song profile information 109 is repeatedly recorded onto the media 26 at intervals of approximately once per second. Only one such data recorded episode is shown in FIG. 11. Accordingly, if the playback apparatus (e.g. VCR or Laser disc) is fast forwarded, rewound and started in the middle of a song, the decoder in accordance with the teachings of the present invention, will receive information/data about song X in not more than one second later. Thus, control unit 23 is provided with the necessary data to permit it to perform the automatic key range and other adjustment correctly as described above in what is referred to herein as real-time control.

In addition, real-time control of the stage-effect apparatus (not shown) such as lighting and other special effects equipment are accomplished by encoding of the appropriate data commands at the appropriate instances during selected vertical blanking pulses corresponding to that portion of song X at which the stage effect is desired.

The encoded data is more clearly illustrated in phantom outline 109. Basically speaking, horizontal lines during the vertical fly-back period are used to carry the song profile data, for example, in a "NTSC" standard video signal format. It should be recognized that other video standards such as "PAL" and "SECAM" are also suitable for data encoding in accordance with the invention.

The term "song profile data" shall hereinafter generally mean a recorded data signal(s) on a media containing information representative of the key range and/or the lowest and highest vocal note frequency of the pre-recorded song or a music composition and/or the tempo and style of the pre-recorded song, and/or the key signature of the pre-recorded song.

The term "musical accompaniment" shall mean a musical composition and/or back-up singer's voice pre-recorded on a media.

The term "audio/video playback" equipment/device/apparatus shall mean an audio playback device such as, for example, an analog or digital audio tape recorder, compact disc player, laser disc player or similar equipment, and/or a video tape recorder or the like.

The term "key range" or "key" shall generally mean (in addition to its typical/customary/standard meaning) the spectrum or range of vocal note frequencies between a low and high frequency of a singer or musical recording such as, for example, the six standard ranges bass through soprano and/or an individual's vocal ability range such as, for example, between F1 and F2 shown in FIGS. 5 and 6.

While there has been described herein what is considered to be the preferred embodiment of the invention, other modifications may occur to those skilled in the art, and it is intended that the appended claims to cover all such modifications as fall within the true spirit and scope of the invention.

What is claimed is:

1. A control system for so-called KARAOKE accompaniment apparatus for a singer that plays a musical accompaniment prerecorded in one of a plurality of musical key ranges, comprising:
    means for determining an individual vocal range (77) of the singer and for generating a vocal range signal indicative of said individual vocal range;
    means for generating a song profile data information/command signal being indicative of the musical key range (78) of the prerecorded musical accompaniment;
    customized key adjustment means responsive to said vocal range signal and said song profile data information/command signal for automatically controlling the accompaniment apparatus for adjusting the musical key range of the prerecorded musical accompaniment (78) to substantially coincide with said individual vocal range of the singer (77).

2. A control system as in claim 1, wherein:
    the song profile data generating means includes an audio playback device and a media having song profile data stored thereon.

3. A control system as in claim 1, wherein:

the song profile data generating means includes a video playback device and a video recording media having song profile data recorded thereon.

4. A control system as in claim 1, wherein:
the song profile data generating means includes an audio or audio/video playback equipment having a recording media with song profile data recorded thereon and operatively coupled to said audio or audio/video playback equipment.

5. A control system as in claim 1, wherein:
the means for controlling the accompaniment apparatus includes a digital signal processor and a song profile interpreter and microprocessor.

6. A control system as in claim 1, wherein:
said means for controlling the accompaniment apparatus being responsive to signal components including key signature, key range, musical tempo and song style of said song profile data information/command signal for effecting control of the musical accompaniment provided by the musical accompaniment apparatus.

7. A control system as in claim 1, wherein:
said means for controlling the musical accompaniment apparatus being responsive to a key range signal component of said song profile data information/command signal for effecting control of the musical accompaniment key range which can be provided by the musical accompaniment apparatus.

8. A control system as in claim 1, wherein:
said customized key adjustment means for controlling the musical accompaniment apparatus being responsive to a song style signal component of said song profile data information/command signal for effecting control of the musical accompaniment style characteristic which can be provided by the musical accompaniment apparatus.

9. A control system as in claim 1, wherein:
said means for controlling the musical accompaniment apparatus being responsive to a key signature signal component of said song profile data information/command signal for effecting control of the musical accompaniment apparatus.

10. A control system as in claim 1, wherein:
said means for controlling the musical accompaniment apparatus includes an audio signal processing means for determining selected vocal characteristics of the singer.

11. A control system as in claim 1, including:
a voice analyzing means for determining the lowest and highest musical notes (F1, F2) of the singer and being responsive thereto and to said song profile data information/command signal (104, 109) for automatically adjusting the key shifter component (60) of the musical accompaniment apparatus, whereby each of the frequency components (78) of the musical accompaniment (78) being frequency altered to comprise an altered key range musical accompaniment composition (79) substantially corresponding to the determined key range (77) or its harmonics and sub harmonics of the singer.

12. A control system as in claim 1, including:
motion control means for providing a motion control signal during the performance of the singer, whereby physical objects may be selectively dispositioned for stage effects.

13. A control system as in claim 1, in combination comprising:
lighting and motion control driver means for selectively providing lighting and motion control signals to provide real-time stage effects.

14. An accompaniment control system for providing a musical composition accompaniment signal and singing environment control stage effect signals, in combination comprising:
audio/video playback means having an audio/video media for providing a musical composition signal and a song profile data signal and a stage effect data signal;
customized key adjustment means (23) for adjusting the frequency bandwidth (78) of said musical composition accompaniment signal (X) about a predetermined central frequency, including a digital signal processor (56) operatively coupled to an input microphone (38) and a central processing unit (52), a vertical blanking interval data decoder (53) operatively coupled to said audio/video playback means and to said central processing unit, a signal energy detector (58) and data demodulator (50) each operatively coupled to said audio/video playback means and to said central processing unit, a front panel user interface unit (30) to enable selective operation of said control means;
whereby said customized key adjustment means in response to said song profile data signal adjusts the key range of said musical composition signal and in response to said stage effect data signal provides a lighting and motion control signal (71).

15. A musical accompaniment control system as in claim 14, including:
audio processing means (55) operatively coupled to said control means and including a vocal enhancer circuitry (59) and one or more key shifter circuit means (60) and one or more audio mixer circuit means (63, 64).

16. A musical accompaniment control system as in claim 14, including:
means for recording said song profile data onto said audio/video media comprising a data entry interface means (88) to enable manual entry of song profile data, a frame formatter means (89) being responsive to and for formatting of said song profile data into a non real-time frame format, a serial data transmitter means (91) responsive to the formatted song profile data for converting parallel-to-serial character format, a data modulator (95) being responsive to the serial character format song profile data output of said serial data transmitter means for converting the digital data into a representative song profile data analog signal, an audio mixer means (100) being responsive to an audio signal and said song profile data analog signal for generating a composite signal containing said song profile data, recording means (101) responsive to said composite signal for recording said song profile data onto said audio/video media.

17. A musical accompaniment control system as in claim 14, including:
means for recording said song profile data onto said audio/video media comprising a data entry interface means (88) to enable manual entry of song profile data, a frame formatter means (92) being responsive to and for formatting of said song profile data into real-time frame format, a serial data transmitter means (94) responsive to the formatted song profile data output of said frame formatter for converting the formatted data from parallel-to-serial character format, a vertical blanking interval data encoder (97) responsive to the output of said serial data transmitter for generating a song profile data video signal, a video mixer (99) being responsive to a video signal source (98) and said song profile data video signal for generating a composite video signal containing said song profile data, recording means responsive to said composite video signal for recording said song profile data onto said audio/video media.

18. An accompaniment control system as in claim 17, wherein:

said audio/video media contains information descriptive of the musical attributes of a song recorded thereon being encoded by means of modulating the luminance signal during the vertical blanking interval of the video waveform, co-existing with normal picture information and musical signals on the same media, whereby a musical accompaniment and reproduction is effected for improved harmony and unity between the KARAOKE singer and the musical accompaniment.

* * * * *